(12) United States Patent
Gabrys (10) Patent No.: US 7,525,230 B1
(45) Date of Patent: Apr. 28, 2009

(54) AIR CORE MOTOR-GENERATOR

(75) Inventor: Christopher W. Gabrys, Reno, NV (US)

(73) Assignee: Revolution Electric Motor Company, Reno, NV (US)

( * ) Notice: Subject to any disclaimer, the term of this patent is extended or adjusted under 35 U.S.C. 154(b) by 186 days.

(21) Appl. No.: 11/255,501

(22) Filed: Oct. 20, 2005

(51) Int. Cl.
*H02K 1/00* (2006.01)
*H02K 3/00* (2006.01)

(52) U.S. Cl. ............... 310/179; 310/218; 310/259; 310/260; 310/271; 310/266; 310/270; 310/214

(58) Field of Classification Search ......... 310/179–208, 310/218, 259, 260, 271, 266, 112, 114, 270, 310/214
See application file for complete search history.

(56) References Cited

U.S. PATENT DOCUMENTS

| | | | | |
|---|---|---|---|---|
| 720,307 | A | * | 2/1903 | Wood ............... 310/271 |
| 2,606,134 | A | * | 8/1952 | Sanders ............... 156/56 |
| 2,759,116 | A | * | 8/1956 | Glass ............... 310/171 |
| 4,019,075 | A | * | 4/1977 | Kagami ............... 310/206 |
| 4,538,083 | A | | 8/1985 | Nozawa ............... 310/198 |
| 4,607,803 | A | | 8/1986 | Nozawa ............... 242/1.1 B |
| 4,616,407 | A | * | 10/1986 | Tamaki et al. ............... 29/596 |
| 5,495,658 | A | * | 3/1996 | Teshigawara et al. ......... 29/598 |
| 5,723,933 | A | | 3/1998 | Griindi ............... 310/266 |
| 5,831,365 | A | | 11/1998 | Keim ............... 310/156 |
| 5,864,198 | A | * | 1/1999 | Pinkerton ............... 310/266 |
| 6,288,341 | B1 | * | 9/2001 | Tsunoda et al. ............... 174/137 B |
| 6,373,162 | B1 | * | 4/2002 | Liang et al. ............... 310/156.53 |
| 6,507,991 | B1 | | 1/2003 | Ozawa ............... 29/596 |
| 6,525,437 | B1 | | 2/2003 | Ozawa ............... 310/65 |
| 6,531,864 | B2 | | 3/2003 | Montagu ............... 324/146 |
| 6,710,492 | B2 | * | 3/2004 | Minagawa ............... 310/113 |
| 6,768,240 | B2 | * | 7/2004 | Younsi et al. ............... 310/201 |
| 6,794,776 | B1 | * | 9/2004 | Gabrys ............... 310/74 |
| 6,873,085 | B2 | | 3/2005 | Graham ............... 310/266 |
| 6,894,418 | B2 | | 5/2005 | Jones ............... 310/208 |
| 2002/0047418 | A1 | * | 4/2002 | Seguchi et al. ............... 310/114 |

FOREIGN PATENT DOCUMENTS

| | | | | |
|---|---|---|---|---|
| DE | | 4008083 A | * | 9/1991 |
| JP | | 58058845 A | * | 4/1983 |
| JP | | 59006753 A | * | 1/1984 |

* cited by examiner

*Primary Examiner*—Burton Mullins
*Assistant Examiner*—Alex W Mok
(74) *Attorney, Agent, or Firm*—J. Michael Neary (57) ABSTRACT

A brushless motor-generator includes a rotor having a ferromagnetic tube with radially polarized, alternating polarity permanent magnet poles, and an air core armature that magnetically exerts torque upon the rotor. The magnetic poles drive magnetic flux across a radial magnetic air gap inside of the tube and through windings of the armature that are located in the air gap. The windings utilize wire that is comprised of multiple individually insulated strands that are bundled together and sheathed in an outer electrically insulating serve that separates adjacent windings and provides a higher dielectric breakdown strength than the insulation on the individually insulated strands. A thin circumferentially tensioned band is wrapped around the outer diameter of the axially traversing portions of the windings where located inside the magnetic air gap, imparting radial compression and structural integrity to the windings and increasing the circumferential structural strength of the air core armature for torque production.

20 Claims, 7 Drawing Sheets

AIR CORE MOTOR-GENERATOR

This invention pertains to motor-generators for converting between electrical and mechanical energy, and more importantly to a brushless, radial gap, motor-generator of specialized construction for providing increased efficiency and power capability with more reliable and lower cost construction.

BACKGROUND OF THE INVENTION

There is a desire for low cost electrical machines for converting between electrical and mechanical energy that have both high efficiency and high performance capability. Unfortunately, current devices tend to suffer from one or more of a number of deficiencies that include low efficiency, low performance or speed capability, complex and expensive construction and poor heat transfer. One factor contributing to both the losses and complexity of many machines is the required use of laminations. Laminations reduce eddy current losses and the materials can be chosen for low hysteresis losses. However, the lamination losses still tend be about 3-4% or higher, depending on the lamination thickness, material grade and rotor operating speed. Another deficiency in many current designs is the result of slot winding. Slot winding allows for placement and structural support of armature windings while having a small air gap. However, the structure in which these slots are formed undesirably increases the inductance of the armature coils and also causes field variations during rotation, giving rise to added losses.

Other radial gap air core motor-generators have previously been constructed by winding individual coils and inserting them into a mold and potting them with epoxy or other curable resin. Unfortunately, this manufacturing method suffers from deficiencies including high tooling costs and long manufacturing times which make it costly in mass production operations. Yet another inherent difficulty with this construction is that the structural strength of the whole armature is provided by the potting and the adhesive bonding strength between the windings and resin. For some types of winding wires, and those optimized for high voltage operation with an outer serve, the inherent bond strength can be very low. As a result, these conventionally potted air core armatures do not provide adequate strength for operation. Further, the compaction of the windings is less than ideal because the windings must be manually inserted prior to potting into oversized tooling. The required potting operations for air core motor-generators are also generally considered one of the key deficiencies with air core motor-generators.

To eliminate these deficiencies, air core type electrical machines can be created. Unfortunately, current air core electrical machines still suffer from deficiencies that can include, low efficiency, limited operational life, poor heat transfer, and complicated, difficult or costly constructions. A better electrical machine providing high efficiency, high performance with reliable life and low manufacturing cost is needed.

SUMMARY OF THE INVENTION

The invention provides an improved brushless motor-generator for converting between electrical and mechanical energy, affording high efficiency, long reliable operating life and is manufactured at low cost. The motor-generator includes a rotor and a stator that magnetically exerts torque upon the rotor. The rotor is constructed of a ferromagnetic tube that has a circumferential array of radially magnetized poles of alternating polarity around the circumferential array. The magnetic poles drive magnetic flux across an armature air gap. The stator includes a stationary air core armature that is located radially adjacent to the ferromagnetic tube and has multiple windings that are located in the air gap in a position to be intersected by the rotating flux field produced by the array of magnet poles. The armature windings utilize wire that is comprised of multiple individually insulated strands that are bundled together and sheathed in an outer electrically insulating serve that separates adjacent windings. The serve provides a higher dielectric breakdown strength than the insulation on the individually insulated strands. This serve in many cases prevents strong adhesive bonding and would limit the strength of a conventional potted armature. The windings traverse axially inside the magnetic air gap, and circumferentially outside the region of the air gap crossed by the flux field. A thin circumferentially tensioned band is wrapped around the outer diameter of the axial traversing portions of the air core armature windings where located inside the magnetic air gap. The tensioned band imparts radial compression and structural integrity to the windings, increases the packing factor and reduces the overall radial thickness of the air core armature. Additionally, the tensioned band increases the circumferential structural strength of the air core armature for torque production.

The tensioned band is wrapped directly over the windings inside the magnetic air gap. This additional wrapping of a band inside the air gap would normally be considered undesirable in conventional motor design because the band thickness would be thought to increase the required magnetic air gap thickness, which would normally be expected to require use of more magnet material or to degrade performance. Likewise, the armature windings of the motor-generator, also contrary to conventional air core armature winding practice, preferably do not depend on potting or resin impregnation for their structural strength. Instead, the tensioned band over wrapping the windings provides structural support. The tensioned band compresses the air core armature windings, increases the packing factor, and provides structural integrity to the windings. It has been found that the radial thickness of the band that provides sufficient support can be made thin, less than 10 mils in many cases. This is thin enough to prevent significant deterioration of the operating performance. Although the band thickness is significant compared to the air gap in a conventional slot wound motor, the band thickness is only a small portion of the air gap in an air core motor-generator, in most cases less than 2%. As a result, the tensioned band does not appreciably degrade the motor-generator performance. Further, the tension that can be applied to the band when over wrapping the armature can provide compression to the windings, as good or better than with a fixed tooling mold for conventional potted armature manufacturing. This compression can in many cases compress the armature such that the radial thickness with the tensioned band is less than an equivalent conventionally manufactured air core armature.

The tensioned band provides increased structural strength and significantly increased diametral bending stiffness, even when windings having poor adhesion capability are utilized in the armature. The tensioned band can be wrapped over the armature after winding. No costly or time consuming potting operations are required as in a conventional air core motor-generator armature. Resin impregnation of the armature windings may be used but in many cases is unnecessary because the tensioned band affords high structural integrity and compression of the armature windings, so the added costs and increased manufacturing process time needed in resin impregnation process steps can be saved.

The tension band provides additional structural integrity to the windings through the compression and the friction resulting from the compression. For additionally increased strength, the band can preferably include an adhesive. In this construction, the band can be adhered to the air core armature with any suitable adhesive, such as pressure sensitive adhesive, two-part adhesive, or solvent adhesive, among the many possibilities. One low cost type of band with easy installation comprises adhesive backed tape. For increased circumferential stiffness, the band can comprise circumferential fiber reinforcement, such as glass fiber reinforced tape. A preferred method of manufacturing allows for high-tension force in the band and radial pressure from the band. This can be achieved by utilizing a band has an axial width that is less than the axial width of the magnetic air gap and band is tensioned around the air core armature with multiple circumferential passes. An additional benefit of the construction is that the band maintains a substantially circular outer diameter of the windings.

The rotor in one embodiment of the invention includes inner and outer ferromagnetic cylinders that are radially spaced apart, and a circumferential array of circumferentially alternating radial polarity magnetic poles on at least one cylinder. This double rotating type construction provides a low reluctance flux path in which the flux is substantially constant, thereby affording the highest possible efficiency by eliminating substantially all hysteresis and eddy current losses and also the need for electrical laminations. The magnetic poles drive rays of magnet flux of alternating polarity radially across a magnetic air gap formed between the cylinders. Both cylinders rotate together, precluding development of magnetic losses in the ferromagnetic cylinders. The stator includes the air core armature that is located in the air gap radially between the inner ferromagnetic cylinder and the outer ferromagnetic cylinder. The armature contains multiple windings that are located in the magnetic air gap and receive the alternating magnetic flux such that AC voltage is induced in the windings as the rotor rotates. The armature windings utilize wire that is comprised of multiple individually insulated strands that are bundled together and sheathed in an outer electrically insulating serve that separates adjacent windings such that the serve provides a higher dielectric breakdown strength than the insulation on the individually insulated strands. The air core armature also includes a substantially non-ferromagnetic form that provides structural support for the windings, and additionally a radially thin circumferentially tensioned band over wrapping the outer diameter of the air core armature inside the magnetic air gap, wherein the tensioned band provides radial containment for the windings.

Double rotating air core motor-generators place the highest demands on the air core armature. The armature is completely self supporting in the magnetic air gap and further it transfers the entire torque of the armature windings directly to the motor-generator stator cantilevered from only one end. For maintaining low costs, the air gap should be as small as possible, resulting in small clearances between the armature and two rotating rotor surfaces. The air core armature must possess sufficient strength and stiffness to hold its circularity and prevent contact with the double rotating cylinders of the rotor in operation, especially after resistance heating during high power operation. Application of the tensioned band over the windings compresses the armature windings against the inner nonmagnetic form tube. Although it would be possible to increase the diametral bending stiffness of an armature by simply increasing the radial thickness of the inner form tube without the outer tensioned band, the outer tensioned band is several hundred times more effective at increasing stiffness per unit added thickness. Because the tensioned band is radially spaced apart from the inner form tube and this radial distance is maintained by the position of the winding wires, the three elements cooperate to act as a curved beam. The application of even a thin outer tensioned band thereby substantially increases the bending moment of inertia. The resulting armature is both structurally stiffer and stronger than a conventional air core armature, even without potting or resin impregnation.

In a preferred construction for motor-generators in accordance with the embodiment that utilizes a double rotating configuration, the armature is wound on a form that has radially extending portions that extend radially outward from an inner tube, and the band is radially supported by the radially extending portions. In a preferred embodiment, the band and the radially extending portions cooperate to provide substantially increased diametral bending stiffness of the air core armature. For substantially increased bending stiffness, the band is adhered to the radially extending portions of the form such that the adhesion works to resist changes in the circularity of the air core armature.

Fiber windings are routinely over wrapped on magnets in conventional rotating magnet rotors to support the magnets so they maintain integrity when rotated at high speed. However, in an air core motor-generator in accordance with this invention, the over wrapping is provided over the windings instead of the magnets. Further, the tensioned band and over wrapped windings are stationary and do not provide containment against centrifugal loading. Instead, the tensioned band facilitates operation at all speeds by providing the armature structural stiffness and strength and maintaining the circularity to prevent contact between the air core armature and rotor in operation.

Motor-generators in accordance with this invention have many potential uses including commercial motors of many kinds, motor-generators for use in flywheel energy storage systems and energy recovery systems such as regenerative braking for vehicles and the like.

DESCRIPTION OF THE DRAWINGS

The invention and its many advantages and features will become better understood upon reading the following detailed description of the preferred embodiments in conjunction with the following drawings, wherein.

DESCRIPTION OF THE PREFERRED EMBODIMENT

Figure 1:
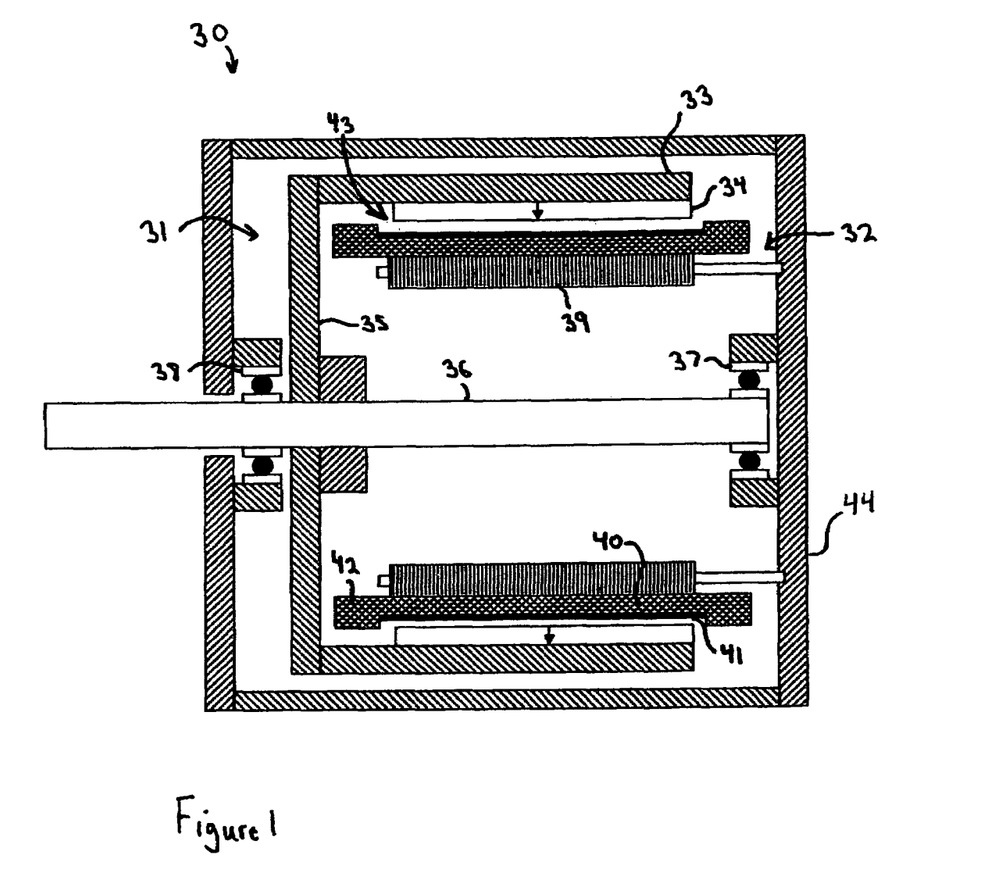
FIG. 1 is a sectional elevation of an air core motor-generator in accordance with the invention.

Turning to the drawings, wherein like reference characters designate identical or corresponding parts, FIG. 1 shows an improved motor-generator 30 having a rotor 31 mounted for rotation relative to a stationary stator 32. The rotor 31 includes an outer steel tube 33 that has a circumferential array of radially polarized magnetic poles 34 of circumferentially alternating polarity, as shown more clearly in FIG. 3. The poles 34 can include magnets and consequence steel poles or more preferably are all magnets for maximum flux production. A hub plate 35 attaches the steel tube 33 to a central shaft 36 that is journalled for rotation in bearings 37, 38. The magnetic poles 34 drive magnetic flux radially across a radial magnetic air gap 43 defined between the rotor 33 and a stationary back iron 39 attached to a stationary housing 44. The back iron 39 is preferably constructed of ferromagnetic material with magnetic induced loss mitigating properties. One preferred construction for the back iron 39 is a tube made of multiple steel ring laminations, however powder core back iron can be used instead.

The stator 32 includes an air core armature 40 having windings that are located radially within the magnetic air gap 43, so that the windings receive the flux from the magnetic poles 34. To reduce eddy current losses that would otherwise occur in the armature windings, the windings are wound with wire comprising multiple individually insulated strands that are bundled together, or Litz wire. The strands can be round as in typical Litz wire or rectangular wires or a stack of ribbon wires that are properly orientated for low eddy current losses. Although the insulation on the strands does insulate them from adjacent turns in the armature windings, I have found that this insulation is not adequate for long term reliable operation with high voltages driven by a motor drive inverter. As a result, the wire is covered with an outer sheath 'serve' that separates adjacent bundles of windings and provides a higher dielectric breakdown strength than the insulation on the individual strands. The windings have active lengths that traverse axially inside of the magnetic air gap 43, and have end turns extending circumferentially outside the flux field produced by the magnetic poles, linking the active lengths. Although air core motor-generators can utilize non-served wires and solid conductor wires, they result in greater voltage breakdown susceptibility and higher eddy current losses, respectively.

Because the windings utilize wire with the outer sheath serve, they do not readily lend themselves to strong structure strength for the air core armature 40 from resin impregnation. For some thin polymer serves, no resin can impregnate the individual strands and the serve surface may not adhere well to resin either. Serves of Teflon or Tefzel are generally known to be nonstick with adhesives. Further reducing the structural strength of the air core armature 40 is the fact that the windings must traverse primarily axially in the magnetic air gap 43 and adjacent windings in some cases contribute zero circumferential structural strength to the air core armature 40. These windings must transfer all of the torque of the motor-generator 30.

To increase the strength of the armature 40, a radially thin tensioned band 41 is over wrapped around the outer diameter of the axially traversing portions of the served stranded armature windings where located in the magnetic air gap. This portion of the windings is responsible for the torque production and is also inherently the weakest in structural strength because of the winding direction. The band 41 substantially increases the structural strength of the windings and allows an air core motor-generator to be constructed with Litz wire for high efficiency and served windings for long reliable operation life, further with low cost manufacturing. After winding the wire windings of the air core armature 40, the band 41 is wrapped over the outer diameter of the windings to secure the windings for motor-generator operation. An additional benefit of the construction is that the tensioned band 41 also imparts radial compression on the windings. This compression can squeeze together the multiple individually insulated strands, reducing the radial thickness of the air core armature 40. The reduced armature thickness allows for a reduction of the required magnetic air gap 43, which in turn allows for increased efficiency and power capability and or reduced volume of magnets 34 and costs. The tension of the band also imparts friction between the windings and between the windings and band that makes it stiffer. The band 41 may cover only the active length portions of the windings in the magnetic air gap 43, or can also cover end turn portions 42 that may extend outside the magnetic air gap 43, depending on the winding pattern.

Figure 2:
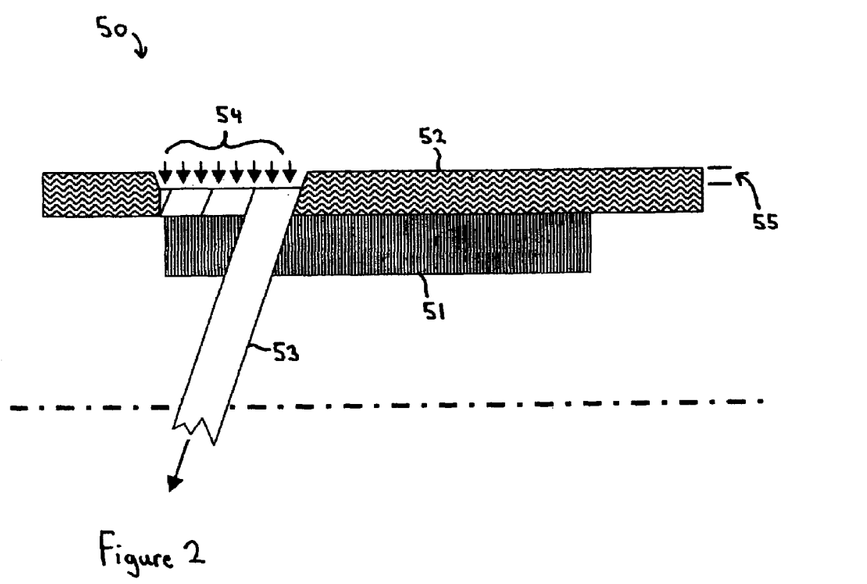
FIG. 2 is a sectional elevation of a portion of an air core motor-generator in accordance with the invention, illustrating the manufacturing of an air core armature.

The manufacturing of an air core motor-generator 50, like the embodiment of FIG. 1, is shown in FIG. 2. The motor-generator 50 comprises an inner laminated back iron tube 51, like the back iron 39 of FIG. 1. Armature windings 52 are wound on top of the inner back iron 51. After completing the windings 52, a tensioned band 53 is wrapped over the windings 52. The tension on the band 53 imparts a radial compression pressure onto the outer diameter of the windings 52. The radial compression force 54 increases with successive turns wrapped on top with the band. The band radially compresses the windings 52 against the back iron 51, reducing their thickness 55 while also providing sufficient structural strength to facilitate torque production of the windings. The flexibility of the windings from use of multiple individually insulated strand wire reduces the winding stiffness, making the structurally integrity without use of the band 53 lower. The band 53 maintains a substantially circular outer diameter of the windings 52, also allowing for a reduction of the required magnetic air gap despite the addition of the radial thickness of the band 53. Maximum radial compression force 54 is preferably achieved by utilizing a narrow band such that the axial width of the band 53 is less than the axial width of the magnetic air gap and the band is tensioned around the armature with multiple circumferential passes.

Figure 3:
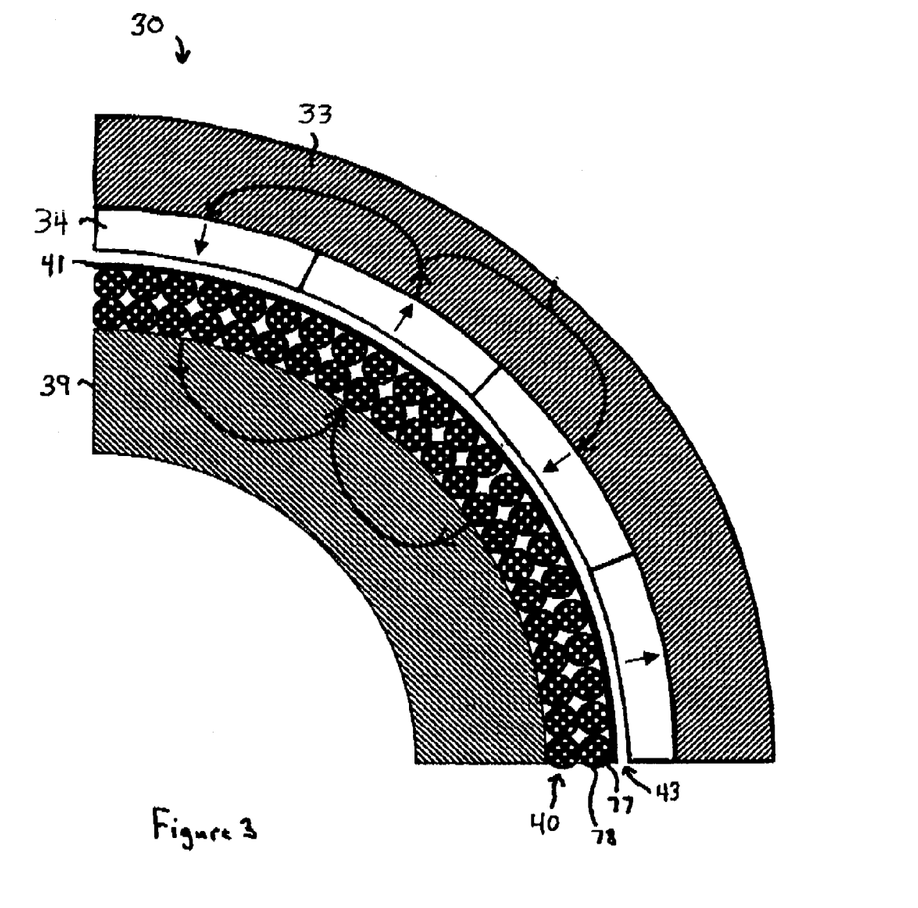
FIG. 3 is a sectional end elevation of the air core motor-generator of FIG. 1 in accordance with the invention.

An enlarged section of the air core motor-generator 30 of FIG. 1 is shown schematically in FIG. 3. The tensioned band 41 over wrapping the outer diameter of air core armature 40 inside the magnetic air gap 43 provides radial containment of the windings. The band 41 preferably provides a substantial increase in the circumferential strength of the air core armature 40 for torque production. The spaces between the served wires, shown for clarity of illustration, would actually be eliminated by the compression on the windings afforded by the tensioned band 41.

Although the tensioned band 41 can greatly increase the structural integrity of the air core armature 40 through tension, compaction of the windings, and the friction between the serves 78 on the multiple individually insulated strands 77 of the armature windings, a preferred band construction includes an adhesive that provides adhesion between the band 41 and air core armature 40. In one preferred embodiment, the band 41 comprises an adhesive backed tape. This allows for very rapid and low costs manufacturing of the motor-generator, by potentially eliminating all potting and curing operations for armature manufacture. The tape is tightly wrapped over the served windings after being wound, thereby securing them in place by tension, and the tape secures itself after over wrapping by means of its own adhesive. When required for maximum tension capability, compression and structural strength, the band may also contain fiber reinforcement such as a fiber tow or through use of fiber reinforced tape. The tensioned band can also be wet resin-impregnated tape, such as a fiberglass tape made of multiple fiberglass tows impregnated by passing through an epoxy resin bath on the way to being wound onto the armature windings. Although the use of resin-impregnated tape requires a curing step, it can afford increased strength and a higher temperature capability to the armature, if specially required for a specific application.

Figure 4:
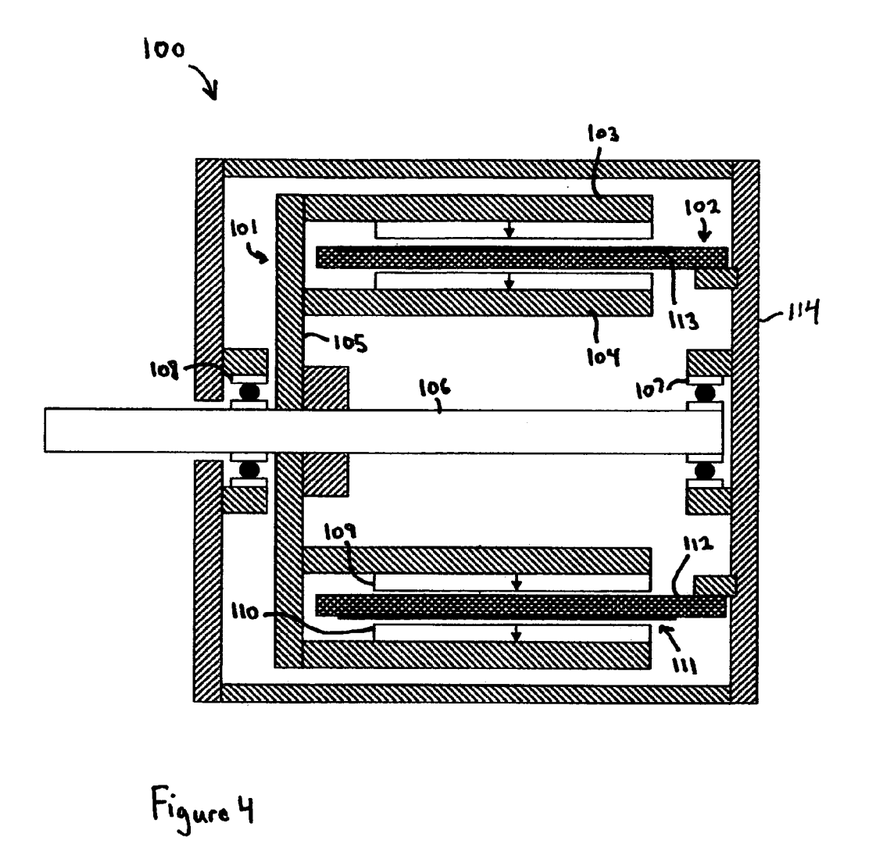
FIG. 4 is a sectional elevation of an alternate configuration air core motor-generator in accordance with the invention.
Figure 5:
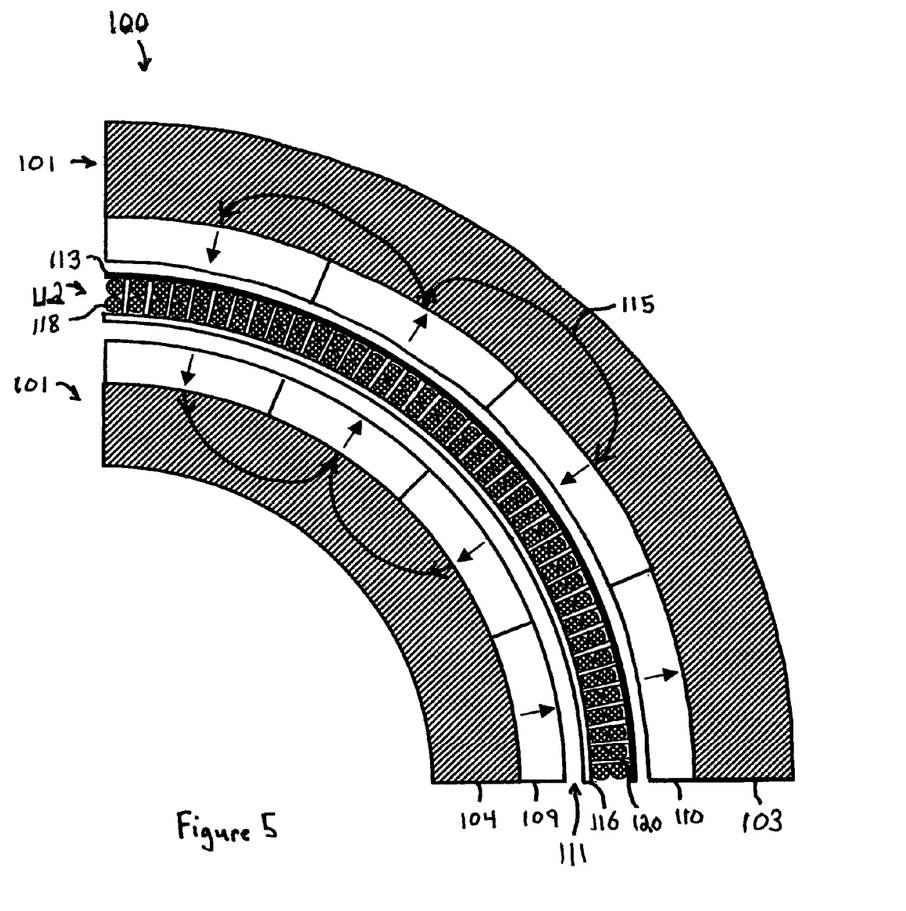
FIG. 5 is an enlarged sectional partial end view of the air core motor-generator of FIG. 4.

Another configuration air core motor-generator 100, shown in FIGS. 4 and 5, maximizes efficiency and potential for cost reduction by replacing the steel stator back iron 39 in the motor-generator 30 with an inner steel cylindrical back iron 104, which rotates as part of the rotor with an outer steel cylinder 103. The motor-generator 100, like the motor-generator 30 of FIGS. 1 and 3, has a rotor 101 and a stator 102. The rotor 101 is constructed of the outer steel cylinder 103, and the inner steel cylinder 104 that is radially spaced apart from the outer cylinder 103. The cylinders 103, 104 each hold circumferential arrays of radially polarized alternating polarity magnets 109, 110, as shown in more detail in FIG. 5, that drive rays of alternating polarity magnetic flux 115 across a magnetic air gap 111 formed therebetween. Although magnets 109, 110 could be located on only one cylinder 103, 104, they are preferably located on both cylinders to provide maximum flux density across the magnetic air gap 111. The steel cylinders 103, 104 are connected to a central shaft 106 through a hub plate 105 and thus rotate together. The shaft 106 is journalled for rotation by bearings 107, 108 mounted in a stationary housing 114.

The stator 102 includes a cylindrical air core armature 112 that is located radially between the inner and outer cylinders 104, 103, and has windings 118 (shown in FIG. 5) that receive magnetic flux in the magnetic air gap 111. AC voltage is induced in the armature windings as the rotor 101 rotates. The windings are wound utilizing wire comprised of multiple individually insulated strands that are bundled together and sheathed in an outer electrically insulating serve. The serve provides a higher dielectric breakdown strength than the insulation on the individually insulated strands. The windings have active lengths that traverse axially inside the magnetic air gap, and end turns that traverse circumferentially and connect the active lengths. In the double rotating configuration of the motor-generator 100, as shown, the air core armature 112 requires even greater structural strength, in part because it is not supported by an inner stationary steel stator back iron and is supported only at one end. The air core armature must directly transfer all of the torque produced in the motor-generator, which can be substantial depending on the power rating and operational speed.

To provide for improved structural strength of the air core armature 112, the windings are preferably supported by a form tube 116 that holds the windings 118. The form 116 is made of a material, such as plastic, that is substantially non-magnetic and electrically non-conducting. This form 116, illustrated in FIGS. 5, 6B, and also in U.S. patent application Ser. No. 11/207,374 for "High Performance Air Core Motor-Generator Winding" filed on Aug. 18, 2005, (the disclosure of which is incorporated herein by reference) has an inner plastic tube and radially extending ribs 120 that extend from the inner tube and define between the ribs 120 outwardly opening radial channels for holding the windings 118. The structural strength of the air core armature wound with served wire bundles on the inner plastic tube form 116 is increased by the use of an outer tensioned band 113 that is wrapped over the outer diameter of the air core armature 112. In this construction, the band cooperates with the form 116 to act as a structural beam to resist diametral deflection of the air core armature 112. The wire windings in the radial center and the ribs 120 act as the ribs portion of this beam. Diametral defection great enough to cause the air core armature to contact the rotor 101 in operation would be extremely undesirable in operation, especially high speed operation, and would undesirably require an increased magnetic air gap 111. During application of the tension band 113, the air core armature 112 is preferably supported with tooling that holds the armature circular as the band is being applied under tension. In this way, the band will maintain the armature in a circular shape after the banding is completed and inner diameter tooling is removed.

The tensioned band 113 compresses the windings 118 and provides circumferential armature strength and increased diametral armature bending stiffness. In a preferred embodiment of the invention, the tension band preferably includes an adhesive, such as an adhesive backed tape. The radial ribs 120 preferably provide radial support for the band 113 and ensure uniform compression of the windings 118 around the armature 112 and uniform spacing of the band 113 from the inner tube of the form 116. By contact friction and/or adhesion between the band 113 and the radial ribs 120, the diametral bending stiffness and air core armature structural integrity is substantially increased, even with the use of served flexible strand windings and without resin impregnation. The increased stiffness and strength results from the shear transfer of load between the form 116 and the outer tensioned band 113 through the ribs 120 and the compacted windings 118. Together, the tensioned band 113 and form 116 cooperate to form a beam, and the radial ribs 120 and compacted windings 118 carry shear load while the form 116 and band 113 carries tensile and compressive loads when load is applied to deform the air core armature radially. The beam construction increases the bending moment of inertial from a single thin form tube to the whole thickness of the armature which can be more than 12 times thicker or more depending on the motor size and rotational speed. The tension band 113 converts the armature to a beam with an easy and straightforward manufacturing process. The tension in the band can also be applied high enough to insure maintaining tensile load for given levels of armature diameter deformation loads. The band 113 and form 116 cooperate to form a very strong and stiff air core armature for a double rotating construction motor-generator and do so with the use of served stranded windings that would otherwise not lend themselves well to production of a strong or rigid armature.

When winding a tape onto the armature form with helical windings, the lead rate produces an angular deviation from 90°. This angular direction of the band provides improved strength to resist torsional deflection of the armature, which is supported at only one axial end. The improved torsional strength better enables the cantilevered armature to resist torsional deformation that, in extreme cases, could change the axial direction of the active lengths of the armature windings and adversely affect the electrical characteristics of the motor-generator, and could cause shape changes or even, in extreme cases, buckling of the armature structure.

Figure 6A:
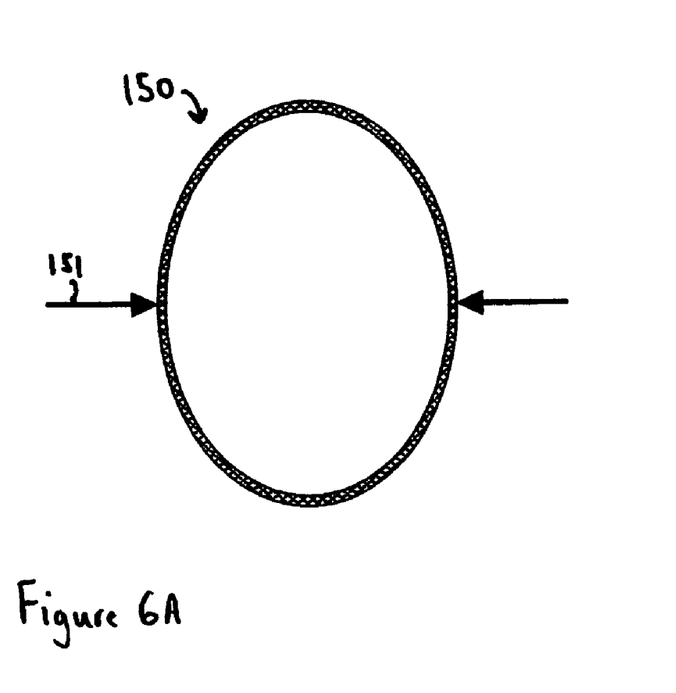
FIG. 6A is a schematic drawing of an air core armature not in accordance with the invention.
Figure 6B:
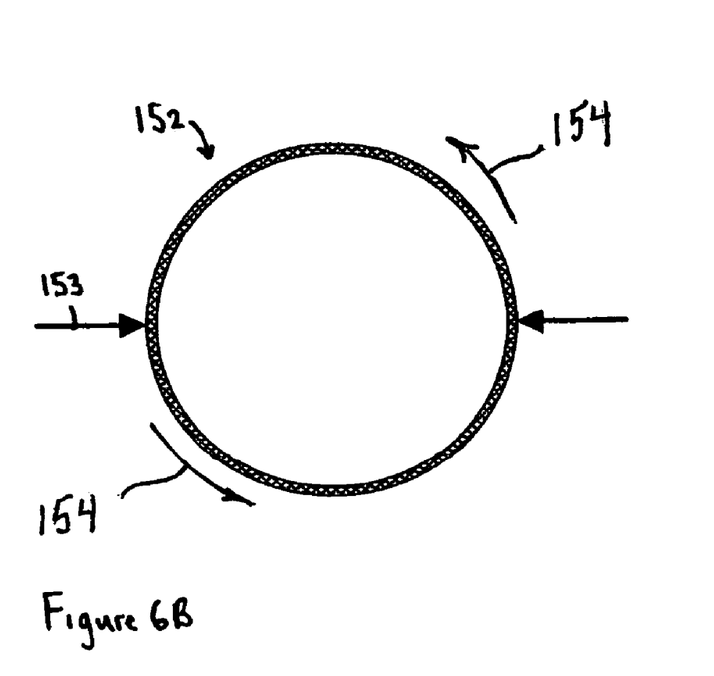
FIG. 6B is a schematic drawing of an air core armature in accordance with the invention.

An air core armature not in accordance with the invention is shown in FIG. 6A, while an air core armature in accordance with the invention is shown in FIG. 6B. As shown, a very small radial load 151 on the air core armature 150 results in deforming the armature such that it would not allow proper operation of the motor-generator and could cause contact to occur between the air core armature and the rotor. Even residual stress in the form or stress applied from the windings could cause unacceptable deformation. Stresses in operation of the motor-generator from torque production can be many times higher.

The air core armature 152 in accordance with the invention is substantially stiffer and holds its circularity despite application of substantial radial and torsional loads 153 and 154. The outer band cooperates with the air core armature to allow the motor-generator to function properly.

Figure 7:
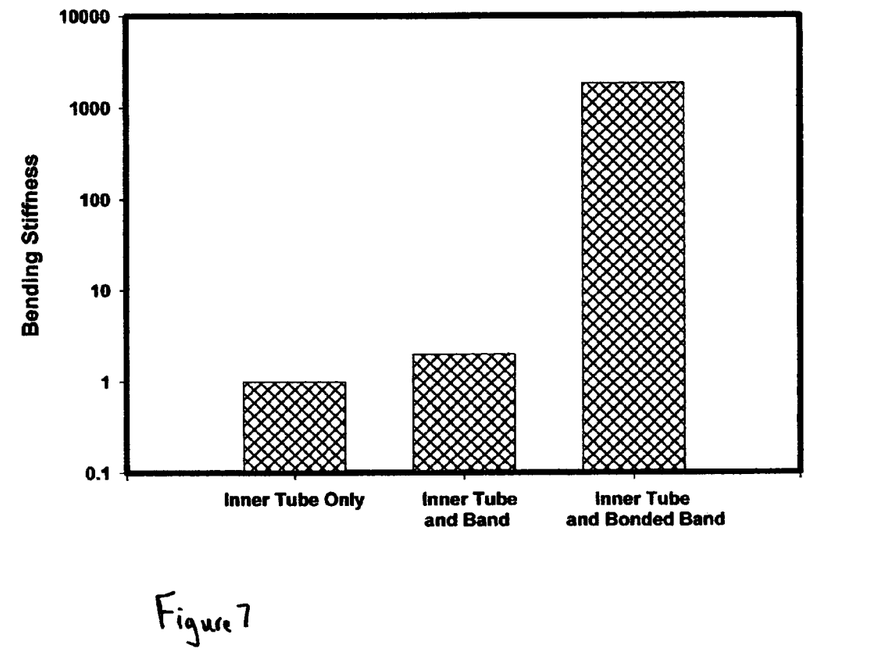
FIG. 7 is a graph comparing the diametral bending stiffness of different air core armatures.

A comparison of the diametral bending stiffness of different air core armatures is shown in FIG. 7. The bending stiffness of an air core armature in a double rotating configuration of a motor-generator such as FIGS. 4 and 5, is compared. With only the inner tube of a form, the bending stiffness of the armature diametral bending stiffness is low. It can be deflected substantially by just hand pressure. The addition of even a 3 mil thickness outer band with the inner tube can more than double the bending stiffness while also advantageously radially compressing the armature windings to allow for a reduced magnetic air gap thickness. However, when the inner tube is coupled to the outer band in a way that transfers shear load, such as friction or an adhesive bonded connection to the radial ribs or the windings, the diametral bending stiffness is even more greatly increased. For a 40 hp size air core motor-generator, in accordance with the invention, the application of an adhesively attached outer tensioned band provides more than a 500 times increase in the armature bending stiffness. The tensioned band allows the motor-generator to operate reliably, whereas the motor-generator operation without the band would be less reliable because of inferior resistance against radial and torsional deformation. The construction insures that the armature remains circular, prevents armature to rotor contact and allows for long reliable high torque operation.

Obviously, numerous modifications and variations of the described preferred embodiment are possible and will occur to those skilled in the art in light of this disclosure of the invention. For example, all the disclosed embodiments use permanent magnets for the flux source, but an inductor alternator with an air core armature and using a stationary field coil as the source of flux is also contemplated. Accordingly, I intend that these modifications and variations, and the equivalents thereof, be included within the spirit and scope of the invention as defined in the following claims.

I claim:

1. A brushless motor-generator for converting between electrical and mechanical energy comprising:
   a rotor that rotates about an axis of rotation, and a stator that is stationary and magnetically exerts torque upon said rotor, said rotor and said stator being radially separated and defining therebetween a radial air gap;
   said rotor having a ferromagnetic tube having an inner diameter, and a circumferential array of radially polarized magnetic poles of alternating polarity on said inner diameter of said ferromagnetic tube, wherein said magnetic poles drive magnet flux radially across said air gap;
   said stator including an air core armature that is located radially inside of said ferromagnetic tube and having multiple windings that are located in said magnetic air gap, and a nonmagnetic tube form onto which the windings are secured, said armature being positioned in said air gap so as to receive said magnetic flux such that AC voltage is induced in said windings as said rotor rotates;
   said windings having active lengths that traverse axially inside said magnetic air gap, and circumferential end turns linking said active lengths;
   said air core armature having a radially thin circumferentially tensioned band over wrapping the outer diameter of the axially traversing portions of said windings where located inside said magnetic air gap, wherein said tensioned band imparts radial compression and structural integrity to said windings.

2. A brushless motor-generator as described in claim 1 wherein:
   said windings utilizing wire that is comprised of multiple individually insulated strands that are bundled together.

3. A brushless motor-generator as described in claim 2 wherein:
   said stands are sheathed in an outer electrically insulating serve that separates adjacent windings such that said serve provides a higher dielectric breakdown strength than the insulation on said individually insulated strands.

4. A brushless motor-generator as described in claim 3 wherein:
   said band is adhered to said air core armature by adhesive.

5. A brushless motor-generator as described in claim 1 wherein:
   said band has an axial width that is less than the axial width of said magnetic air gap and said band is tensioned around said air core armature with multiple circumferential passes.

6. A brushless motor-generator as described in claim 5 wherein:
   said band comprises adhesive backed tape.

7. A brushless motor-generator for converting between electrical and mechanical energy comprising:
   a rotor that rotates about an axis of rotation and a stator that is stationary and magnetically exerts torque upon said rotor;
   said rotor is comprised of a ferromagnetic tube with a circumferential array of radially alternating polarity magnetic poles on the radial surface of said ferromagnetic tube wherein said magnetic poles drive magnet flux radially across a magnetic air gap;
   said stator comprising an air core armature that is located radially adjacent said ferromagnetic tube and having multiple windings that are located in said magnetic air gap that receive said magnetic flux such that AC voltage is induced in said windings as said rotor rotates;
   said windings having active lengths traversing axially inside said magnetic air gap and circumferentially extending end turns linking said active lengths;
   said air core armature further comprising a substantially non-ferromagnetic tube located radially inside said windings that provides structural support for said windings, and a radially thin circumferentially tensioned band over wrapping the outer diameter of the air core armature inside said magnetic air gap, wherein said tensioned band increases the circumferential structural strength of said air core armature for torque production.

8. A brushless motor-generator as described in claim 7 wherein:
   said windings utilizing wire that is comprised of multiple individually insulated strands that are bundled together.

9. A brushless motor-generator as described in claim 8 wherein:
   said strands are sheathed in an outer electrically insulating serve that separates adjacent windings such that said serve provides a higher dielectric breakdown strength than the insulation on said individually insulated strands.

10. A brushless motor-generator as described in claim 9 wherein:
    said band is adhered to said air core armature by adhesive.

11. A brushless motor-generator as described in claim 7 wherein:

said band has an axial width that is less than the axial width of said magnetic air gap and said band is tensioned around said air core armature with multiple circumferential passes.

12. A brushless motor-generator as described in claim 11 wherein:

said band comprises adhesive backed tape.

13. A brushless permanent magnet motor-generator for converting between electrical and mechanical energy comprising:

a rotor that rotates about an axis of rotation and a stator that is stationary and magnetically exerts torque upon said rotor;

said rotor is comprised of an inner ferromagnetic cylinder and an outer ferromagnetic cylinder, said cylinders being radially spaced apart and having a circumferential array of radially polarized, circumferentially alternating polarity poles having permanent magnets as a source of magnetic flux, wherein said magnetic poles drive magnet flux radially across a magnetic air gap formed therebetween;

said stator comprising an air core armature that is located radially been said inner ferromagnetic cylinder and said outer ferromagnetic cylinder and having multiple windings that are located in said magnetic air gap that receive said magnetic flux such that AC voltage is induced in said windings as said rotor rotates;

said windings traversing axially inside said magnetic air gap and circumferentially;

said air core armature further comprising a substantially non-ferromagnetic form that provides structural support for said windings and additionally a radially thin circumferentially tensioned band over wrapping the outer diameter of the air core armature inside said magnetic air gap, wherein said tensioned band provides radial containment for said windings.

14. A brushless permanent magnet motor-generator as described in claim 13 wherein:

said windings utilizing wire that is comprised of multiple individually insulated strands that are bundled together.

15. A brushless permanent magnet motor-generator as described in claim 14 wherein:

said strands are sheathed in an outer electrically insulating serve that separates adjacent windings such that said serve provides a higher dielectric breakdown strength than the insulation on said individually insulated strands.

16. A brushless permanent magnet motor-generator as described in claim 13 wherein:

said band is adhered to said air core armature by adhesive.

17. A brushless permanent magnet motor-generator as described in claim 13 wherein:

said band includes fiber reinforcement.

18. A brushless permanent magnet motor-generator as described in claim 17 wherein:

said band comprises adhesive backed tape.

19. A brushless permanent magnet motor-generator as described in claim 13 wherein:

said band cooperates with said form to provide substantially increased diametral bending stiffness of said air core armature.

20. A brushless permanent magnet motor-generator as described in claim 13 wherein:

said band has an axial width that is less than the axial width of said magnetic air gap and said band is tensioned around said air core armature with multiple circumferential passes.

* * * * *